US006340526B1

(12) United States Patent
Inno et al.

(10) Patent No.: US 6,340,526 B1

(45) Date of Patent: Jan. 22, 2002

(54) WATERLESS PLANOGRAPHIC PRINTING PLATE PRECURSOR AND PRODUCTION METHOD THEREOF

(75) Inventors: Toshifumi Inno; Tsumoru Hirano, both of Shizuoka-ken (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/499,646

(22) Filed: Feb. 8, 2000

(30) Foreign Application Priority Data

Feb. 18, 1999 (JP) .......................................... 11-039332

(51) Int. Cl.[7] ............................................... B32B 25/20

(52) U.S. Cl. ....................................... 428/391; 428/195

(58) Field of Search ................................ 101/454, 457, 101/467, 456, 463.1; 428/323, 391, 195; 430/272, 286, 494

(56) References Cited

U.S. PATENT DOCUMENTS

| | | | | | |
|---|---|---|---|---|---|
| 5,339,737 | A | * | 8/1994 | Lewis et al. | 101/454 |
| 5,379,598 | A | * | 1/1995 | Mostello | 62/24 |
| 5,570,636 | A | * | 11/1996 | Lewis | 101/454 |
| 5,704,291 | A | * | 1/1998 | Lewis | 101/457 |
| 5,786,125 | A | * | 7/1998 | Tsuchiya et al. | |

FOREIGN PATENT DOCUMENTS

| | | | | |
|---|---|---|---|---|
| EP | 091492 | A2 | | 5/1999 |
| EP | 0914942 | A2 | * | 5/1999 |
| JP | 11-348444 | A | | 12/1999 |
| JP | 11-352673 | A | | 12/1999 |

* cited by examiner

*Primary Examiner*—Merrick Dixon

(74) *Attorney, Agent, or Firm*—Burns, Doane, Swecker & Mathis, LLP

(57) ABSTRACT

A waterless planographic printing plate precursor on which laser writing is possible, which has excellent scratch resistance and solvent resistance, and which also has excellent image reproducibility. The waterless planographic printing plate precursor includes a substrate on which are superposed in the following order a light-to-heat conversion layer containing a compound for converting laser light to heat, and a silicone rubber layer, wherein the light-to-heat conversion layer contains a reaction product of a metallic chelate compound such as titanium diisopropoxide bis (2,4-pentadionate) and/or a self-condensation product of a metallic chelate compound.

17 Claims, No Drawings

WATERLESS PLANOGRAPHIC PRINTING PLATE PRECURSOR AND PRODUCTION METHOD THEREOF

BACKGROUND OF THE INVENTION

1. Field of the Invention

The present invention relates to a planographic printing plate precursor for preparing a waterless planographic printing plate and to a production method thereof and, in particular, to a waterless planographic printing plate precursor on which heat mode recording using laser light is possible, and which has excellent scratch resistance, solvent resistance, and image reproducibility and to a production method thereof.

2. Description of the Related Art

It is difficult in the conventional printing method, which requires dampening water, to control the delicate balance between the dampening water and the ink. Consequently, the ink may become emulsified or mixed in with the dampening water causing an inferior ink density and background staining which leads to paper loss.

In contrast, waterless planographic printing plates have numerous advantages because they do not require dampening water. Various types of waterless planographic printing plates which allow planographic printing to be carried out without using dampening water are proposed in, for example: Japanese Patent Application Publication (JP-B) Nos. 44-23042, 46-16044, 54-26923, 56-14976, 56-23150, and 61-54222; and Japanese Patent Application Laid-Open (JP-A) Nos. 58-215411, 2-16561, and 2-236550.

Among the above waterless planographic printing plates are disclosed several having an extremely high performance. These waterless planographic printing plates comprise a substrate on which are disposed a primer layer, a photopolymeric light-to-heat conversion layer, and a silicone rubber layer in that order. Portions of the photopolymeric light-to-heat conversion layer exposed by an exposure light undergo polymeric hardening and the strength of the adhesion thereof with the silicone rubber layer is increased. During developing, only the unexposed portions of the silicone rubber layer are peeled away to receive the ink and thus form an image.

However, due to the rapid advances in recent years of output systems such as pre-press systems, image setters, and laser printers, methods for providing printing plates have been proposed which use new plate-making methods such as computer-to-plate and computer-to-cylinder methods in which print images are converted into digital data. Therefore, new types of printing materials are sought after for use in these printing systems and the development thereof is proceeding steadily.

However, the majority of these technologies relate to conventional planographic printing plates which print using dampening water, and currently there is almost nothing known about such technologies for waterless planographic printing plates.

The waterless planographic printing plate precursors disclosed in, for example, U.S. Pat. No. 5,353,705, International Publication (WO) No. 9401280, and Japanese Patent Application Laid-Open (JP-A) No. 9-131978 are examples of waterless planographic plates which can be formed by laser writing. However, because the removal of the ink repellant silicone rubber layer in these technologies relies on ablation of the light-to-heat conversion layer by laser irradiation, the linearity of fine lines and the circularity of dots is very poor and not satisfactory in a print image, therefore, an improvement has been widely looked for. Moreover, in the conventional technology, because the adhesion between the light-to-heat conversion layer and the silicone rubber layer, as well as the resistance to solvents of the light-to-heat conversion layer are both poor, during handling of the printing plates, when the surface of the plate is being washed with solvent, or during the printing process, problems occur as the printing plate tends to scratch easily enabling ink to be thickly deposited in the scratches and thus staining non-image areas. In order to prevent scratches, the addition of a silane coupling agent to the silicone rubber layer has been disclosed. However, adding the silane coupling agent is insufficient in increasing the adhesion between the light-to-heat conversion layer and the silicone rubber layer, and the improvement in scratch resistance is also minimal.

SUMMARY OF THE INVENTION

The aim of the present invention is therefore to provide a waterless planographic printing plate precursor which is laser writable and has excellent scratch resistance, solvent resistance, and image reproducibility.

As the result of intense research, the present inventors have discovered that the aim of the present invention can be achieved by superposing in the following order on a substrate a light-to-heat conversion layer containing a compound for converting laser light to heat, and a silicone rubber layer to form a waterless planographic printing plate precursor, wherein the light-to-heat conversion layer is formed by the coating and drying on the substrate of a coating solution containing a metallic chelate compound and a compound for converting laser light to heat, and preferably further containing a polymer having active hydrogen in the molecule.

Namely, the present invention is a waterless planographic printing plate precursor comprising a substrate on which are superposed a light-to-heat conversion layer containing a compound for converting laser light to heat, and a silicone rubber layer in that order, wherein the light-to-heat conversion layer contains a reaction product of a metallic chelate compound and/or a self-condensation product of a metallic chelate compound. The light-to-heat conversion layer further preferably contains a polymer having active hydrogen in the molecule.

Moreover, the present invention provides a method for producing a waterless planographic printing plate precursor, wherein a light-to-heat conversion layer is formed by coating on a substrate a first coating solution containing a compound for converting laser light to heat and a metallic chelate compound, coating on the light-to-heat conversion layer a second coating solution containing silicone, and heating the coated film to form a silicon rubber layer.

In the present invention, during the coating and drying of the light-to-heat conversion layer, the metallic chelate compound reacts with a compound containing active hydrogen. If the metallic chelate compound reacts with water, hydrolysis and condensation reactions progress; if the metallic chelate compound reacts with a polymer having active hydrogen in the molecule, a cross-linked structure is formed. As a result of this, the resistance to solvents of the light-to-heat conversion layer is improved due to the chemical bonding and the physical interlocking of the polymer molecules. Moreover, the adhesion between the light-to-heat conversion layer and the silicone layer when the silicone layer is being applied and dried is increased which improves the scratch resistance. The reason for the increase in the adhesion between the light-to-heat conversion layer and the silicone layer is as yet unclear, however, it is thought to be due to the formation of a covalent bond or to the formation of an extremely strong interaction between the residue of the reaction product of the metallic chelate compound contained in the light-to-heat conversion layer and the silicone cross-linking agent contained in the silicone layer.

DESCRIPTION OF THE PREFERRED EMBODIMENTS

The present invention is explained below in detail.

The present invention is a waterless planographic printing plate precursor comprising a substrate on which are superposed in the following order a light-to-heat conversion layer containing a compound for converting laser light to heat, and a silicone rubber layer.

The light-to-heat conversion layer used in the present invention is a layer having the function of converting laser light used for writing to heat (light-to-heat conversion) and is formed by a coating process. The coating solution of the light-to-heat conversion layer used in the present invention contains at least: (1) a metallic chelate compound; and (2) a light-to-heat conversion agent and, preferably, further contains: (3) a polymer having active hydrogen in the molecule.

The metallic chelate compound (1) used in the present invention is a compound in which a chelating agent having two or more donor groups capable of coordinating to a metal is coordinated to the metal, and having one or more cyclic structures.

Examples of the donor group when the donor atom is oxygen include —OH, —COOH, >C═O, —O—, —COOR (wherein R represents an aliphatic group or an aromatic hydrocarbon group), —N═O, —$NO_2$, >N→O, —$SO_3H$, —$PO_3H_2$, and the like; examples when the donor atom is nitrogen include —$NH_2$, >NH, >N—, —N═N—, ═N—OH, —$NO_2$, —N═O, >C═N—, >C═NH, and the like; and examples when the donor atom is sulfur include —SH, —S—, >C=S, —CO—SH, —CS—OH, —CS—SH, —SCN, and the like.

Examples of the chelating agent include: β-diketone type 2,4-pentanedione (acetylacetone), 2,4-heptanedione, and the like; ketoester type methyl acetoacetate, ethyl acetoacetate, butyl acetoacetate, and the like; hydroxycarboxylic acid or esters thereof, salt type lactic acid, methyl lactate, ethyl lactate, ammonium lactate, salicylic acid, methyl salicylate, ethyl salicylate, phenyl salicylate, malic acid, ethyl malate, tartaric acid, methyl tartrate, ethyl tartrate, and the like; ketoalcohol type 4-hydroxy-4-methyl-2-pentanone, 4-hydroxy-2-pentanone, 4-hydroxy-2-heptanone, 4-hydroxy-4-methyl-2-heptanone, and the like; aminoalcohol type monoethanolamine, diethanolamine, triethanolamine, N-methyl-monoethanolamine, N-ethyl-monoethanolamine, N,N-dimethyl monoethanolamine, N,N-diethyl monoethanolamine, and the like; and enolic active hydrogen compound type diethyl malonate, methylol melamine, methylolurea, methylol acrylamide, and the like.

Examples of the metal include Al, Ba, Bi, Cd, Ca, Ce, Cr, Co, Cu, Dy, Er, Gd, Hf, Ho, In, Ir, Fe, La, Pb, Li, Lu, Mg, Mn, Mo, Nd, Ni, Pd, Pt, K, Pr, Rh, Ru, Rb, Sm, Sc, Ag, Na, Sr, Ta, Tb, T1, Th, Tm, Sn, Ti, V, Yb, Y, Zn, Zr, and the like, and Al, Ti, and Zr are particularly preferable.

Specific examples of chelate compounds of Al, Ti, and Zr include titanium allyl acetoacetate triisopropoxide, titanium bis (triethanolamine) diisopropoxide, titanium bis (triethanolamine) di-n-butoxide, titanium diisopropoxide bis (2,4-pentadionate), titanium di-n-butoxide bis (2,4-pentadionate), titanium diisopropoxide bis (2,2,6,6-tetramethyl-3,5-heptanedionate), titanium diisopropoxide bis (ethyl acetoacetate), titanium di-n-butoxide bis (ethyl acetoacetate), titanium ethyl acetoacetate tri-n-butoxide, titanium methacryloxy ethyl acetate triisopropoxide, titanium oxide bis (2,4-pentadionate), titanium tetra (2-ethyl-3-hydroxy-hexyloxide), dihydroxy bis (lactate) titanium, (ethylene glycolate) titanium bis (dioctyl phosphate), aluminum s-butoxide bis (ethyl acetoacetate), aluminum di-s-butoxide ethyl acetoacetate, aluminum diisopropoxide ethyl acetoacetate, aluminum tris (hexafluoropentanedionate), aluminum tris (2,4-pentanedionate), aluminum 9-octadecenyl acetoacetate diisopropoxide, aluminum tris (2,2,6,6-tetramethyl-3,5-heptanedionate), aluminum tris (ethyl acetoacetate), zirconium di-n-butoxide bis (2,4-pentanedionate), zirconium tetrakis (hexafluoropentanedionate), zirconium tetrakis (trifluoropentanedionate), zirconium methacryloxy ethyl acetoacetate tri-n-propoxide, zirconium tetrakis (2,4-pentanedionate), zirconium tetrakis (2,2,6,6-tetramethyl-3,5-heptanedionate), triglycolate zirconic acid, trilactate zirconic acid, and the like. Among these, titanium diisopropoxide bis (2,4-pentadionate), titanium diisopropoxide bis (ethyl acetoacetate), aluminum tris (2,4-pentanedionate), aluminum s-butoxide bis (ethyl acetoacetate), zirconium tetrakis (2,4-pentadionate), zirconium di-n-butoxide bis (2,4-pentadionate), and the like are preferable.

Because the reactivity of the hydrolysis or ester conversion reaction of metallic chelate compounds such as these is mild compared with the corresponding metallic alcoxides, they are advantageous from a handling and storage point of view. Their use is particularly advantageous in view of the storage stability of the coating solution of the light-to-heat conversion layer used in the present invention.

The metallic chelate compound used in the present invention may be used singly or a combinations of two or more types may be used. The amount of the metallic chelate compound used is 1–50% by weight of the total solid component weight of the coating solution of the light-to-heat conversion layer, and is preferably 6–45% by weight, and more preferably 10–40% by weight. If the amount of metallic chelate compound used is less than 1% by weight, the solvent resistance of the light-to-heat conversion layer and the adhesion thereof with the silicone layer is insufficient. If the amount of metallic compound used is more than 50% by weight, the light-to-heat conversion layer hardens and the scratch resistance and print durability tend to deteriorate.

Inorganic pigments, organic pigments, organic dyes, metals, or metal oxides may be used as the compound (2) for converting laser light to heat (light-to-heat conversion agent) used in the present invention. Examples of the inorganic pigment include various carbon blacks such as acidic carbon black, basic carbon black, neutral carbon black, and carbon black whose surface is modified or coated in order to improve dispersability. Various nigrocins may be used as the organic pigment. Moreover, each of the various compounds disclosed in the publications below may be used as the organic dye, namely, those disclosed in: "Infrared Sensitizing Dyes", by Matsuoka (Plenum Press, New York, 1990); U.S. Pat. Nos. 4,833,124, 4,772,583, 4,942,141, 4,948,776, 4,948,777, 4,948,778, 4,950,639, 4,912,083, 4,952,552, and 5,023,229; and European Patent Application Laid-Open (EP) 321, 923. As the metal or metallic oxide may be used aluminum, indium tin oxide, tungsten oxide, magnesium oxide, titanium oxide, and the like. In addition to these, conductive polymers such as polypyrrole and polyaniline may be used.

The amount of the compound for converting laser light to heat used is between 5–50% by weight of the total solid component weight of the light-to-heat conversion layer, and preferably 8–45% by weight, and more preferably 10–40% by weight.

A polymer with the ability to form a film (a binder) can be used in the light-to-heat conversion layer. Examples of the polymer which may be used in the light-to-heat conversion layer include: homopolymers and copolymers of acrylates or methacrylates such as polymethyl methacrylate and polybutyl methacrylate; homopolymers and copolymers of styrene based monomers such as polystyrene and α-methylstyrene; various synthetic rubbers such as isoprene and styrene-butadiene; homopolymers and copolymers of vinyl esters such as polyvinyl acetate and vinyl acetate-vinyl chloride; various condensation polymers such as polyester and polycarbonate; and polymers having active hydrogen in the molecule. Among these, polymers having active hydrogen in the molecule are preferable.

The polymer having active hydrogen in the molecule (3) used in the present invention is a polymer which has in the molecule a structural unit having active hydrogen such as —OH, —SH, $—NH_2$, —NH—, $—CO—NH_2$, —CO—NH—, —OCO—NH—, —NH—CO—NH—, —CO—OH, —CS—OH, —CO—SH, —CS—SH, $—SO_3H$, $—PO_3H_2$, $—SO_2—NH_2$, $—SO_2—NH—$, and $—CO—CH_2—CO—$. Examples of polymers which have this type of structural unit in the molecule include: homopolymers or copolymers of monomers containing a carboxyl group such as acrylic acid and methacrylic acid; homopolymers or copolymers of acrylates or methacrylates containing a hydroxyl group such as hydroxyethyl methacrylate and 2-hydroxypropyl acrylate; homopolymers or copolymers of N-alkyl acrylamides and acrylamides; homopolymers or copolymers of reaction products of amines with glycidyl acrylate, glycidyl methacrylate, or allyl glycidyl; homopolymers or copolymers of ethylenic unsaturated monomers containing active hydrogen such as homopolymers or copolymers of p-hydroxystyrene and vinyl alcohol (other ethylenic unsaturated monomers containing active hydrogen or ethylenic unsaturated monomers not containing active hydrogen may be used as a copolymeric monomer component); and condensation products which have a structural unit having active hydrogen in the main chain such as polyurethane resins, polyurea resins, polyamide resins (nylon resins), epoxy resins, polyalkyleneimine resins, novolak resins, and cellulose derivatives.

These binder polymers may be used singly or in combinations of two or more. The amount of the binder used is 20–90 percent by weight, preferably 25–80 percent by weight, and more preferably 30–75 percent by weight of the total solid component weight of the light-to-heat conversion layer.

The amount of the polymer having active hydrogen in the molecule used is preferably 50–100 percent by weight, more preferably 70–100 percent by weight, and still more preferably 90–100 percent by weight of the binder.

Other Components

Other additives are added for various reasons such as to improve the laser recording sensitivity of the light-to-heat conversion layer, to improve the dispersibility of dispersion in the light-to-heat conversion layer, and to improve the adhesion between the light-to-heat conversion layer and an adjacent layer such as the substrate or the primer layer. For example, known compounds may be added which decompose when heated to generate gas in order to improve the laser recording sensitivity. In this case, the laser recording sensitivity is improved because of the rapid expansion in volume of the light-to-heat conversion layer. Examples of these additives include azidodicarbonamide, sulfonylhydrazine, and dinitrosopentamethylenetetramine.

Known compounds which decompose when heated to form acidic compounds may also be used as additives. By using these in combination with the binders used in the so-called "chemical amplification systems" described in: "J. Imaging Sci.", P59–64, 30(2), (1986), Frechet et al.; "Polymers in Electronics (Symposium Series)", P11, 242, T. Davidson, Ed., ACS Washington, D.C. (1984), Ito & Wilson; and "Microelectronic Engineering", P3–10, 13 (1991), E. Reichmanis & L. F. Thompson, the decomposition temperature of the component of the light-to-heat conversion layer can be greatly reduced. As a result, an improvement in the laser recording sensitivity becomes possible. Examples of these additives include iodonium salts, sulfonium salts, phosphonium tosylate, oxime sulfonate, dicarbodiimide sulfonate, and triazine.

It is also possible to introduce a different cross-linking structure by using a combination of known multifunctional cross-linking agents such as a multifunctional isocyanate compound, a multifunctional epoxy compound, and a multifunctional methylol compound.

When a pigment such as carbon black is used as the light-to-heat conversion agent, the level of dispersion of the pigment may affect the laser recording sensitivity, therefore, various dispersing agents are used as additives. In addition to these, various other additives may be added if required such as surfactants to increase coatability.

The components of the above light-to-heat conversion layer used in the present invention may be dissolved in either one suitable solvent or a mixture of suitable solvents such as 2-methoxyethanol, 2-methoxyethylacetate, propylene glycol methyl ethyl acetate, methyl lactate, ethyl lactate, propylene glycol monomethyl ether, ethanol, isopropanol, methyl ethyl ketone, N,N-dimethyl formamide, N,N-dimethyl acetamide, tetrahydrofuran, and dioxane and coated and dried on a substrate. The preferable drying temperature depends on the solvent and metallic chelate compound used, however, a drying temperature of over 100° C. is preferable.

The weight of the coating after drying should be in the range of 0.05–10 $g/m^2$ and a preferable range is from 0.1–5 $g/m^2$. If the thickness of the light-to-heat conversion layer is too thick, then the laser recording sensitivity is reduced.

A cross-linked silicone rubber layer used in the present invention is preferably formed by hardening condensate-type silicone using a cross-linking agent or by addition polymerization of addition-type silicone using a catalyst. When a condensate-type silicone is used, it is preferable that the composition is as follows: to (a) 100 parts by weight of diorganopolysiloxane should be added (b) 3–70 parts by weight of condensate-type cross-linking agent and (c) 0.01–40 parts by weight of catalyst.

The diorganopolysiloxane of the above component (a) is a polymer having a repeating unit such as that shown in the general formula below, wherein $R^1$ and $R^2$ are an alkyl group having 1–10 carbon atoms, an alkenyl group (preferably a vinyl group) having 2–10 carbon atoms, or an aryl group having 6–20 carbon atoms. These groups may have a suitable substituent group. Generally, it is preferable that 60% or more of $R^1$ and $R^2$ are comprised of a methyl group, a vinyl halide group, or a phenyl halide group.

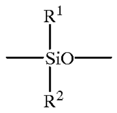

It is preferable that a diorganopolysiloxane having a hydroxyl group in both terminals is used as the diorganopolysiloxane.

The number-average molecular weight of the above component (a) is preferably 3,000–100,000, and more preferably 10,000–70,000.

Any cross-linking agent may be used for component (b) provided that it is a condensate type, however, one such as that represented by the following general formula is preferable.

$R^1m.Si.Xn$

In the above formula, m+n=4 and n is two or more.

In the above formula, $R^1$ is the same as the $R^1$ described above, and X represents a halogen atom such as Cl, Br, or I, a hydrogen atom, or a hydroxyl group, or an organic substituent group such as that shown below.

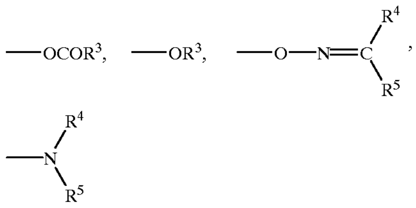

wherein $R^3$ represents an alkyl group having 1–10 carbon atoms or an aryl group having 6–20 carbon atoms, and $R^4$ and $R^5$ represent an alkyl group having 1–10 carbon atoms.

Known catalysts such as metallic carboxylates of tin, zinc, lead, calcium and manganese (for example tin dibutyl laurate, lead octylate, lead naphthenate, and the like), or chloroplatinic acid may be used for component (c).

When addition-type silicone is used, it is preferable that the composition is as follows: to (d) 100 parts by weight of diorganopolysiloxane having an addition reactive functional group should be added (e) 0.1–10 parts by weight of organohydrogen polysiloxane and (f) 0.00001–1 parts by weight of addition catalyst.

The above component (d) diorganopolysiloxane having an addition reactive functional group is an organopolysiloxane having in a molecule at least two alkenyl groups (preferably vinyl groups) having 2–10 carbon atoms directly bonded to silicon atoms, and the alkenyl groups may be at the terminals or middle of the molecules. Organic groups other than an alkenyl group include a substituted or unsubstituted alkyl group having 1–10 carbon atoms or an aryl group having 6–20 carbon atoms. Component (d) may optionally contain a minute amount of a hydroxyl group. The number-average molecular weight of component (d) is preferably from 3,000–100,000, and more preferably from 10,000–70,000.

Examples of component (e) include polydimethyl siloxane having a hydroxyl group at both terminals, α, ω-dimethyl polysiloxane, copolymers of dimethyl siloxane-methyl siloxane having a methyl group at both terminals, annular polymethyl siloxane, polymethyl siloxane having a trimethyl silyl group at both terminals, and copolymers of methyl siloxane—dimethyl siloxane having a trimethyl silyl group at both terminals.

Component (f) may be optionally selected from known catalysts, however, platinum based compounds are particularly desirable and examples thereof include platinum, platinum chloride, chloroplatinic acid, olefin coordinated platinum, and the like.

It is also possible to add a cross-linking control agent such as an organopolysiloxane containing a vinyl group such as tetracyclo (methyl vinyl) siloxane, an alcohol having a carbon-carbon triple bond, acetone, methyl ethyl ketone, methanol, ethanol, propylene glycol monomethyl ether, and the like in order to control the rate of curing in the compositions.

Note that, if necessary, adhesion aids and photopolymerization initiator agents such as fine powders of inorganic substances such as silica, calcium carbonate, titanium oxide, silane coupling agents, titanate based coupling agents, and aluminum based coupling agents may be added to the silicone rubber layer.

The composition of the above silicone rubber layer used in the present invention may also be prepared by being dissolved in a suitable single solvent such as a petroleum solvent, Isopar E, Isopar G, Isopar H (manufactured by Esso Chemicals), hexane, heptane, toluene, xylene, and the like, or in a mixture of a suitable combination of these solvents, and then coated on a substrate, dried, and cured.

If the weight of coating of the silicone rubber layer used in the present invention is too small, the ink repellency is reduced and scratches are easily formed. If the weight of the coating of the silicone rubber layer is too large, the developability deteriorates. Therefore, the preferable weight of the coating is from 0.5 to 5 $g/m^2$, and more preferably from 1–3 $g/m^2$.

In the waterless planographic printing plate described here, various silicone rubber layers may be further coated on top of the silicone rubber layer. Moreover, to protect the surface of the silicone rubber layer, a transparent film, for example, polyethylene, polypropylene, polyvinyl chloride, polyvinylidene chloride, polyvinyl alcohol, polyethylene terephthalate, cellophane, and the like may be laminated thereon, or a polymer coating may be coated thereon. These films are peeled away from the silicone rubber layer when the printing plate is to be used. Note that these films may also be drawn over the layer, or alternatively a matting process may be carried out on the surface, however, in the present invention, it is preferable if the surface used has not undergone a matting process.

The substrate used in the present invention should have sufficient flexibility that it can be set in a normal printing machine, yet at the same time, be able to withstand the load applied to it during printing. Accordingly, typical substrates include coated paper, metallic plates such as aluminum, plastic films such as polyethylene terephthalate, rubber or a composite thereof. Preferable examples thereof include aluminum and aluminum containing alloys (e.g. alloys of aluminum and metals such as silicon, copper, manganese, magnesium, chrome, zinc, lead, bismuth, and nickel) as well as plastic films.

The thickness of the substrate is preferably from 25 μm to 3 mm, and more preferably from 75 μm to 500 μm. The optimum thickness differs, however, depending on the type of substrate used and the printing conditions. Generally, a substrate whose thickness is from 100 μm to 300 μm is most preferable.

In the present invention, in order to improve the adhesion between the substrate and the light-to-heat conversion layer, or to improve printing characteristics, or to increase the sensitivity, a surface processing such as a corona processing or the like may be performed on the substrate or, alternatively, a primer layer may be provided between the substrate and the light-to-heat conversion layer. Examples of the primer layer which may used in the present invention include: those obtained by exposing and then curing various photosensitive polymers before forming a photosensitive resin layer thereon, as disclosed in JP-A No.60-22903; those obtained by heat curing the epoxy resins disclosed in JP-A No. 62-50760; those obtained by forming the gelatins disclosed in JP-A No. 63-133151 into a hard film; those using a silane coupling agents and urethane resins disclosed in JP-A No. 3-200965; and those using the urethane resins disclosed in JP-A No. 3-273248. In addition to these, gelatin or casein formed into a hard film is also effective.

In order to soften the primer layer, a polymer such as a polyurethane having a glass transition temperature of room temperature or lower, polyamide, styrene/butadiene rubber, carboxy modified styrene/butadiene rubber, acrylonitrile/butadiene rubber, carboxy modified acrylonitrile/butadiene rubber, polyisoprene, acrylate rubber, polyethylene, polyethylene chloride, polypropylene chloride, or the like may be added to the primer layer. The amount added is optional and, providing a film layer is able to be formed, the primer layer may be formed solely from additives.

It is also possible to add other additives to the above primer layers in accordance with the above objectives such as dyes, pH indicators, printout agents, photopolymeric initiators, adhesion aids (e.g. polymeric monomers, diazo resins, and silane coupling agents), pigments, silica powder, and titanium oxide powders. Moreover, after coating they can be cured by exposure.

Generally, the preferable weight of the dried primer layer coating is in the range of 0.1–10 g/$m^2$, more preferably from 0.3–8 g/$m^2$, and yet more preferably from 0.5–5 g/$m^2$.

In the present invention, the laser light energy used in the recording is absorbed in the light-to-heart conversion layer of the waterless planographic printing plate precursor of the present invention and converted into heat energy. This causes a chemical reaction or physical change such as combustion, fusion, decomposition, vaporization, explosion and so on in a portion of or in all of the light-to-heat conversion layer, and, as a result, the adhesion between the light-to-heat conversion layer and the silicone rubber layer deteriorates. Laser light is used to expose the waterless planographic printing plate precursor of the present invention. The type of laser is not particularly limited provided that it can provide the necessary amount of exposure for the adhesion to be sufficiently lowered so that the silicone rubber layer can be peeled off and removed, and gas lasers such as Ar lasers and carbon dioxide lasers, solid lasers such as YAG lasers, and semiconductor lasers may be used. A laser in the 50 mW or more constant output class is necessary and for practical reasons, such as maintainability and cost, a semiconductor laser or a semiconductor excitation solid laser (such as a YAG laser) is preferably used. The recording wavelength of these lasers is in the infrared wavelength range and an oscillating wavelength of between 800 nm–1100 nm is often used. It is also possible to perform the exposure using an imaging device described in JP-A 6-186750. When a film is provided to protect the surface of the silicone rubber layer, if the film is transparent to the laser light used, then the surface of the silicone rubber layer may either be exposed with the film in place, or the surface of the silicone rubber layer may be exposed after the film has been peeled off.

The waterless planographic printing plate precursor of the present invention having been exposed by the above method, undergoes a development processing, when necessary, through rubbing or peeling. This processing removes the ink repellent layer of image portions changing them into ink receptive portions. Rubbing development processing is performed by rubbing the plate surface with rubbing member such as a developing pad or a developing brush in either the presence or absence of processing solution. Known processing solutions for waterless planographic printing plates can be used as the processing solution in the present invention. For example, hydrocarbons, polar solvents, water (tap water, pure water, distilled water), and the like, or combinations of these may be used, however, in view of its safety and fire resistance, water or a solvent having water as the main component is preferable. When a solvent having water as the main component is used, it is desirable that the concentration of organic solvent is less than 40 percent by weight.

Usable hydrocarbons include aliphatic hydrocarbons (e.g. hexane, heptane, "Isopar E, G, H"" (manufactured by Esso Chemicals Ltd.), gasoline, kerosene, and the like), aromatic hydrocarbons (e.g. toluene, xylene, and the like), hydrocarbon halides (e.g. trichlene), and the like. Examples of the polar solvent include alcohols (e.g. methanol, ethanol, propanol, isopropanol, benzyl alcohol, ethylene glycol monomethyl ether, 2-ethoxyethanol, diethylene glycol monoethyl ether, diethylene glycol monohexyl ether, triethylene glycol monomethyl ether, propylene glycol monoethyl ether, dipropylene glycol monomethyl ether, polyethylene glycol monomethyl ether, polypropylene glycol, tetraethylene glycol, and the like), ketones (e.g. acetone, methyl ethyl ketone, and the like), esters (e.g. ethyl acetate, methyl lactate, butyl lactate, propylene glycol monomethyl ether acetate, diethylene glycol acetate, diethyl phthalate, and the like), triethyl phosphate, tricresyl phosphate, and the like. The processing solution, in addition to the above organic solutions, water and the like, may include surfactants and the like, and alkalis (e.g. sodium carbonate, diethanol amine, sodium hydroxide, and the like) and the like.

The temperature of the processing solution is optional, however, a temperature between 10° C.–50° C. is preferable.

The above rubbing developing processing as well as the washing processing and drying processing which follow can be performed in an automatic processor. A preferable automatic processor is described in JP-A No. 2-220061.

Peeling developing processing is performed, for example, by adhering a peeling sheet having an adhesive layer to the surface of the silicone rubber layer and then peeling off the adhesive layer. A known flexible substrate having an adhesive layer provided thereon which is able to closely adhere to the surface of the silicone rubber layer can be used as the peeling sheet. Commercially available silicone-based pressure sensitive adhesives such as TSR1510, TSR1511, TSR1515, and TSR1520 manufactured by Toshiba Silicone, and SH4280, SD4560, SD4570, SD4580, and the like, manufactured by Dow Corning Toray Silicone Co., Ltd can be used for the adhesive layer.

The thickness of the adhesive layer is preferably between 1 $\mu$m–200 $\mu$m, more preferably 5 $\mu$m–100 $\mu$m, and yet more preferably 10 $\mu$m–50 $\mu$m.

Commercially available flexible substrates having an adhesive layer prepared thereon which is able to adhere to the surface of a silicone rubber layer may be used as the peeling sheet. Examples thereof include No. 336, No. 360PC, and No. 360UL, manufactured by Nitto Denko Corp., Scotch Tape #851A, Scotch Tape #5413, Scotch Tape

#9396, and Scotch Tape #5490, manufactured by Sumitomo 3M Ltd., Sony Bond Tape T4080, manufactured by Sony Chemicals, Tesa Tape #4428, Tesa Tape #4350-1, Tesa Tape #4142, Tesa Tape #4331, and Tesa Tape #4310, manufactured by Beiersdorf, P-336, P-337, P-904, and P-904HD, manufactured by Permacel, and the like.

Moreover, when printing plates are stacked and stored after completing developing processing such as that described above, it is preferable that protective sheets are interspersed between plates in order to protect each printing plate.

EXAMPLES

The present invention will now be explained in further detail using examples. Note that the present invention is not limited by the examples given below.

Examples 1–8

(Substrate)

A coating solution having the composition given below was coated on a polyethylene terephthalate substrate having a thickness of 175 μm and heated at 100° C. for 1 minute. It was then dried to provide a primer layer having a dry thickness of 0.2 μm.

| | |
|---|---|
| polyethylene chloride | 1.0 g |
| $-\!\!(C_2H_{4-y}Cl_y)_n\!\!-$ | y = 1.7, n = 200 |
| methyl ethyl ketone | 10 g |
| cyclohexane | 100 g |

(Preparation of the carbon black dispersion)

The mixed solution below was dispersed using a paint shaker for 30 minutes then separated from the glass beads by filtering to prepare a carbon black dispersion.

| | |
|---|---|
| carbon black (MA100, manufactured by Mitsubishi Chemical Corp.) | 4.0 g |
| Solsperse S27000, manufactured by ICI | 0.4 g |
| propylene glycol monomethyl ether | 10 g |
| methyl ethyl ketone | 10 g |
| glass beads | 120 g |

(Formation of the light-to-heat conversion layer)

The coating solution given below was coated on the above polyethylene terephthalate having an undercoating of polyethylene chloride coated thereon, heated at 110° C. for 1 minute. It was then dried to form a light-to-heat conversion layer having a dry thickness of 1 μm.

| | |
|---|---|
| the above carbon black dispersion | 20 g |
| a copolymer of hydroxyethyl methacrylate (20% by weight) and methyl methacrylate (80% by weight) | 7.65 g |
| the metallic chelate compound shown in Table 1 | |
| propylene glycol monomethyl ether | 45 g |
| methyl ethyl ketone | 45 g |

TABLE 1

| | Metallic chelate compound | Amount added (g) |
|---|---|---|
| Example 1 | AKT855 (75% isopropanol solution of titanium diisopropoxide bis(2,4-pentadionate), manufactured by Chisso Corp.) | 1.4 |
| Example 2 | AKT855 | 2.7 |
| Example 3 | AKT855 | 6.7 |
| Example 4 | AKT865 (titanium diisopropoxide bis (ethylacetoacetate), manufactured by Chisso Corp.) | 2.5 |
| Example 5 | AKA080 (aluminum tris(2,4-pentadionate), manufactured by Chisso Corp.) | 2.0 |
| Example 6 | AKA023 (aluminum s-butoxide bis (ethylacetoacetate, manufactured by Chisso Corp.) | 2.5 |
| Example 7 | AKZ970 (zirconium tetrakis (2,4-pentadionate), manufactured by Chisso Corp.) | 2.0 |
| Example 8 | AKZ947 (60% butanol solution of zirconium di-n-butoxide bis(2,4-pentadionate), manufactured by Chisso Corp.) | 3.3 |

(Formation of silicone rubber layer)

The solution given below was coated on the above light-to-heat conversion layer and heated at 110° C. for 1 minute. It was then dried to form an addition-type silicone rubber layer having a dry thickness of 2 μm.

α, ω-divinyl polydimethyl siloxane (degree of

| | |
|---|---|
| α,ω-divinyl polydimethyl siloxane (degree of polymerization 700) | 9.00 g |
| $(CH_3)_3$—Si—O—$(SiH(CH_3)$—$O)_8$—$Si(CH_3)_3$ | 0.60 g |
| polydimethyl siloxane (degree of polymerization 8000) | 0.50 g |
| olefin - chloroplatinic acid | 0.08 g |
| inhibitor [HC≡C—$C(CH_3)_2$—O—$Si(CH_3)_3$] | 0.07 g |
| Isopar-G (manufactured by Esso Chemicals) | 55 g |

Polyethylene terephthalate was laminated at a thickness of 6 μm on the surface of the silicone rubber layer formed as described above.

After the cover film of the waterless planographic printing plate precursor of the present invention thus obtained was peeled away, a semiconductor excitation YAG laser having a wavelength of 1064 nm and a beam diameter of 100 μm ($1/e^2$) was used to write a continuous line. The recording energy was set at 0.75 $J/cm^2$. The plate surface was then rubbed using a developing pad containing developing solution 1 having the composition given below and the silicone rubber on the laser irradiated portions was removed. In contrast, the silicone rubber on the non-laser irradiated portions was not removed, but remained on the surface of the waterless planographic printing plate providing a silicone image having sharp edges.

| (Processing solution 1) | |
|---|---|
| polyoxyethylene sorbitan monooleate (Reodor TW-0106) manufactured by Kao Corp. | 5 g |
| water | 995 g |

A semiconductor laser having a wavelength of 825 nm and a beam diameter of 10 μm ($1/e^2$) was used to write on the surface of the waterless planographic printing plate precursor at a power of 110 mW and at a main scanning speed of 6 m/sec. Developing processing was then performed in the same way as described above. A waterless planographic printing plate having a sharp-edged silicone image of a resolution of 8 μm was formed. Under these recording conditions, a dot area ratio of 2% to 98% was formed on the plate when the recording was performed at 200 lines per inch. The non-image portions of the waterless planographic printing plate thus obtained were scratched by the sapphire needle of a HEIDON (surface tester manufactured by Shinto Chemicals) having a width of 0.25 mm under a load of 100 g, and the scratch resistance of the silicone rubber layer was evaluated. When the waterless planographic printing plate formed in this way was used in a printer, 10,000 prints of excellent quality with no blemishes were obtained.

Subsequently, after the surface of the waterless planographic printing plate was wiped with a waste cloth containing washing solution 1 having the composition given below, the printing of a further 10,000 prints of excellent quality having no blemishes was performed.

| (Washing solution 1) | |
|---|---|
| methyl ethyl ketone | 200 g |
| Isopar-E (hydrocarbon-based solvent manufactured by Esso Chemicals) | 800 g |

Comparative Example 1

A waterless planographic printing plate precursor was formed in the same way as for Example 1 except that the metallic chelate compound was not added. Subsequently, also in the same way as for Example 1, writing was performed using a semiconductor excitation YAG laser and a semiconductor laser, and then the same developing processing was performed. However, the edges of the silicone image formed as the recording image were indistinct, and during printing of the recording image, the silicone around the edge portions began to peel as the printing progressed. This led to various drawbacks such as the image area increasing. Moreover, the dot area ratio formed was only 4% to 96% when the recording was performed at 200 lines per inch and a fringe was left remaining in the dot configuration. Scratch resistance was evaluated in the same way as in Example 1, and the results showed that ink was thickly deposited in the areas which were scratched during printing and had caused staining. Solvent resistance was also evaluated in the same way as in Example 1, and the results showed that the silicone layer of non-image portions had partially fallen off, and that ink had been thickly deposited in those areas during printing, causing staining.

Example 9

A waterless planographic printing plate precursor was formed in exactly the same way as in Example 1, except that the condensate type silicone rubber layer was formed using the coating solution given below.

(Composition of silicone rubber layer coating solution)

dimethyl polysiloxane having a hydroxyl group at both

| (Composition of silicone rubber layer coating solution) | |
|---|---|
| dimethyl polysiloxane having a hydroxyl group at both ends (degree of polymerization 700) | 9.00 g |

-continued

| (Composition of silicone rubber layer coating solution) | |
|---|---|
| methyl triacetoxy silane | 0.3 g |
| dibutyl tin dioctanate | 0.2 g |
| Isopar G (manufactured by Esso Chemicals) | 160 g |

Subsequently, after writing was performed using a semiconductor excitation YAG laser and a semiconductor laser, in exactly the same way as in Example 1, developing processing was performed, also in the same way as in Example 1. As a result, a waterless planographic printing plate having a silicone image with sharp edges was formed, in the same way as in Example 1. Moreover, under the same recording conditions as for Example 1, a dot area ratio of 2% to 98% was formed on the plate when the recording was performed at 200 lines per inch. The non-image portions of the waterless planographic printing plate thus obtained were scratched by the sapphire needle of a HEIDON (surface tester manufactured by Shinto Chemicals) having a width of 0.25 mm under a load of 100 g, and the scratch resistance of the silicone rubber layer was evaluated. When the waterless planographic printing plate formed in this way was used in a printer, 10,000 prints of excellent quality with no blemishes were obtained. Subsequently, after the surface of the waterless planographic printing plate was wiped with a waste cloth containing washing solution 1 having the composition given above, the printing of a further 10,000 prints of excellent quality having no blemishes was performed.

Comparative Example 2

A waterless planographic printing plate precursor was formed in exactly the same way as in Example 9, except that the metallic chelate compound was not added. Subsequently, after writing was performed using a semiconductor excitation YAG laser and a semiconductor laser, in exactly the same way as in Example 9, developing processing was performed, also in the same way as in Example 9. However, the edges of the silicone image formed as the recording image were indistinct, and during printing of the recording image, the silicone around the edge portions began to peel as the printing progressed. This led to various drawbacks such as the image area increasing. Moreover, the dot area ratio formed was only 4% to 96% when the recording was performed at 200 lines per inch and a fringe was left remaining in the dot configuration. Scratch resistance was evaluated in the same way as in Example 9, and the results showed that ink was thickly deposited in the areas which were scratched during printing and had caused staining. Solvent resistance was also evaluated in the same way as in Example 9, and the results showed that the silicone layer of non-image portions had partially fallen off, and that ink had been thickly deposited in those areas during printing, causing staining.

Examples 10 to 15

A waterless planographic printing plate precursor was formed in exactly the same way as in Example 1, except that the light-to-heat conversion layer was formed using the coating solution given below.

| (Composition of a coating solution for light-to-heat conversion layer) | |
|---|---|
| the carbon black dispersion of Example 1 | 20 g |
| polymer shown in Table 2 | |
| metallic chelate compound (Titabond-50,-approximately 75% isopropanol solution of titanium diisopropoxide bis(2,4-pentadionate), manufactured by Nippon Soda Co., Ltd.) | 4.67 g |
| propylene glycol monomethyl ether | 70 g |
| methyl ethyl ketone | 70 g |

TABLE 2

| | Polymer | Amount added (g) |
|---|---|---|
| Example 10 | Ethyl cellulose (90–110 cps, 5% toluene/ethanol (8/2) solution, manufactured by Tokyo Kasei Kogyo) | 196.8 |
| Example 11 | Nippolan 2304 (approximately 35% methyl ethyl ketone solution of polyurethane resin, manufactured by Nippon Polyurethane) | 28.1 |
| Example 12 | Phenol Novolak | 9.84 |
| Example 13 | Poly(p-hydroxystyrene) | 9.84 |
| Example 14 | Poly(N-ethyl acrylamide) | 9.84 |
| Example 15 | Copolymer of methyl methacrylate (70% by weight)/methyl acrylate (20% by weight)/methacrylic acid (10% by weight) | 9.84 |

After the cover film was peeled off the waterless planographic printing plate precursor of the present invention thus obtained, a continuous line was recorded thereon using a semiconductor excitation YAG laser having a wavelength of 1064 nm and a beam diameter of 100 μm ($1/e^2$). The recording energy was set at 0.75 J/cm$^2$. Subsequently, the plate surface was rubbed with a developing pad containing developing solution 2 having the composition given below and the silicone rubber layer of the laser irradiated portions were thus removed. In contrast, the silicone rubber layer of the non laser-irradiated portions was not removed and remained on the surface of the waterless plate, providing a silicone image with sharply defined edges.

| (Processing solution 2) | |
|---|---|
| ethylene oxide adduct of polypropylene glycol (Pluronic L62, manufactured by Asahi Denka Kogyo KK) | 5 g |
| water | 995 g |

After writing was performed on the plate surface of the waterless planographic printing plate precursor using a semiconductor laser having a wavelength of 825 nm and a beam diameter of 10 μm ($1/e^2$), and at a main scanning speed of 6 m/second and at a power of 110 mW, developing was performed as described above. A waterless planographic printing plate was formed having a silicone image with sharply defined edges of a resolution of 8 μm. Under these recording conditions, a dot area ratio of 2% to 98% was formed on the plate when the recording was performed at 200 lines per inch. The non-image portions of the waterless printing plate thus obtained were scratched by the sapphire needle of a HEIDON (surface tester manufactured by Shinto Chemicals) having a width of 0.25 mm under a load of 900 g, and the scratch resistance of the silicone rubber layer was evaluated. When the waterless planographic printing plate formed in this way was used in a printer, 10,000 prints of excellent quality with no blemishes were obtained.

Subsequently, after the surface of the waterless planographic printing plate was wiped with a waste cloth containing PC-2 (plate surface washing solution, manufactured by Toray), the printing of a further 10,000 prints of excellent quality having no blemishes was performed.

Comparative Examples 3 to 8

Waterless planographic printing plate precursors were formed in exactly the same way as in Examples 10 to 15, except that the metallic chelate compound was not added. Subsequently, in exactly the same way as in Example 10, writing was performed using a semiconductor excitation YAG laser and a semiconductor laser and then the same developing processing was performed. However, the edges of the silicone image formed as the recording image were indistinct, and during printing of the recording image, the silicon around the edge portions began to peel as the printing progressed. This led to various drawbacks such as the image area increasing. Moreover, the dot area ratio formed was only 4% to 96% when the recording was performed at 200 lines per inch and a fringe was left remaining in the dot configuration. Scratch resistance was evaluated in the same way as in Example 10, and the results showed that ink was thickly deposited in the areas which were scratched during printing and had caused staining. Solvent resistance was also evaluated in the same way as in Example 10, and the results showed that the silicone layer of non-image portions had partially fallen off, and that ink had been thickly deposited in those areas during printing, causing staining.

What is claimed is:

1. A waterless planographic printing plate precursor, comprising in the following order:

a substrate on which are superposed a light-to-heat conversion layer containing a compound for converting laser to heat, together with a reaction product of a metallic chelate compound and/or a self-condensation product of a metallic chelate compound; and a silicone rubber layer, wherein upon laser exposure in image portions to be formed in the light-to-heat conversion layer by the laser exposure, said compound in the light-to-heat conversion layer converts laser light to heat and causes removal of the light-to-heat conversion layer by a process selected from the group consisting of combustion, fusion, decomposition, vaporization and explosion in the image portions.

2. A waterless planographic printing plate precursor according to claim 1, wherein the light-to-heat conversion layer further contains a binder.

3. A waterless planographic printing plate precursor according to claim 1, wherein a primer layer is included between the substrate and the light-to-heat conversion layer.

4. A waterless planographic printing plate precursor according to claim 1, wherein the weight of the light-to-heat conversion layer is 0.05 to 10 g/m$^2$.

5. A waterless planographic printing plate precursor according to claim 2, wherein the binder contains a polymer having active hydrogen in the molecule.

6. A method for producing a waterless planographic printing plate precursor, wherein a light-to-heat conversion layer is formed by coating on a substrate a first coating solution containing a compound for converting laser light to heat and a metallic chelate compound, coating on the light-to-heat conversion layer a second coating solution containing silicone, and heating the coated film to form a silicone rubber layer.

7. A method for producing a waterless planographic printing plate precursor according to claim 6, wherein the first coating solution further contains a binder.

8. A method for producing a waterless planographic printing plate precursor according to claim 7, wherein the binder contains a polymer having active hydrogen in the molecule.

9. A method for producing a waterless planographic printing plate precursor according to claim 6, wherein the content of the metallic chelate compound out of the total solid component weight of the first coating solution is 1 to 50 percent by weight.

10. A method for producing a waterless planographic printing plate precursor according to claim 6, wherein the content of the compound for converting laser light to heat out of the total solid component weight of the first coating solution is 5 to 50 percent by weight.

11. A method for producing a waterless planographic printing plate precursor according to claim 7, wherein the content of the binder out of the total solid component weight of the first coating solution is 20 to 90 percent by weight.

12. A method for producing a waterless planographic printing plate precursor according to claim 8, wherein the content in the binder of the polymer having active hydrogen in the molecule is 50 to 100 percent by weight.

13. A method for producing a waterless planographic printing plate precursor according to claim 6, wherein the metallic chelate compound is selected from a group consisting of titanium diisopropoxide bis (2,4-pentadionate), titanium diisopropoxide bis (ethyl acetoacetate), aluminum tris (2, 4-pentadionate), pentaluminum s-butoxide bis (ethyl acetoacetate), zirconium tetrakis (2,4-adionate), and zirconium di-n-butoxide bis (2, 4-pentadionate).

14. A method for producing a waterless planographic printing plate precursor according to claim 7, wherein the binder is selected from a group consisting of a hydroxy ethyl methacrylate/methyl methacrylate copolymer, ethyl cellulose, polyurethane, phenol novolak, poly (p-hydroxy styrene), poly (N-ethyl acrylamide), and a methyl methacrylate/methyl acrylate/methyacrylic acid terpolymer.

15. A method for producing a waterless planographic printing plate precursor according to claim 6, wherein the silicone is a condensate-type silicone or an addition-type silicone.

16. A waterless planographic printing plate precursor, comprising in the following order:

a substrate on which are superposed a light-to-heat conversion layer containing a compound for converting laser to heat, together with a reaction product of a metallic chelate compound and/or a self-condensation product of a metallic chelate compound; and a silicone rubber layer, wherein upon laser exposure in image portions to be formed in the light-to-heat conversion layer by the laser exposure, said compound in the light-to-heat conversion layer converts laser light to heat and causes removal of the light-to-heat conversion layer by a process selected from the group consisting of combustion, fusion, decomposition, vaporization and explosion in the image portions, and wherein the light-to heat conversion layer does not substantially comprise any film curing agents and agents for increasing adhesion between the light-to-heat conversion layer and the silicone rubber layer other than the metallic chelate compound.

17. A waterless planographic printing plate precursor, comprising in the following order:

a substrate on which are superposed a light-to-heat conversion layer containing a compound for converting laser to heat, together with a reaction product of a metallic chelate compound and/or a self-condensation product of a metallic chelate compound; and a silicone rubber layer, wherein upon laser exposure in image portions to be formed in the light-to-heat conversion layer by the laser exposure, said compound in the light-to-heat conversion layer converts laser light to heat and causes removal of the light-to-heat conversion layer by a process selected from the group consisting of combustion, fusion, decomposition, vaporization and explosion in the image portions, and the amount of the metallic chelate compound is 1–50% by weight of the total solid component weight of the light-to-heat conversion layer.

* * * * *